(12) United States Patent
Bracken

(10) Patent No.: US 11,310,053 B2
(45) Date of Patent: Apr. 19, 2022

(54) SYSTEM AND METHOD OF FILTERING INTERNET TRAFFIC VIA A CLIENT FINGERPRINT

(71) Applicant: Plaid Inc., San Francisco, CA (US)

(72) Inventor: Shawn Bracken, San Francisco, CA (US)

(73) Assignee: Plaid Inc., San Francisco, CA (US)

( * ) Notice: Subject to any disclaimer, the term of this patent is extended or adjusted under 35 U.S.C. 154(b) by 0 days.

(21) Appl. No.: 16/730,037

(22) Filed: Dec. 30, 2019

(65) Prior Publication Data

US 2020/0213206 A1   Jul. 2, 2020

Related U.S. Application Data

(60) Provisional application No. 62/785,703, filed on Dec. 28, 2018.

(51) Int. Cl.

| | | |
|---|---|---|
| *H04L 9/32* | (2006.01) | |
| *H04L 43/026* | (2022.01) | |
| *H04L 29/06* | (2006.01) | |
| *H04L 43/028* | (2022.01) | |
| *H04L 9/06* | (2006.01) | |
| *H04L 43/04* | (2022.01) | |

(52) U.S. Cl.
CPC .......... *H04L 9/3236* (2013.01); *H04L 43/026* (2013.01); *H04L 43/028* (2013.01); *H04L 63/0428* (2013.01); *H04L 63/0876* (2013.01); *H04L 63/1408* (2013.01); *H04L 9/0643* (2013.01); *H04L 43/04* (2013.01)

(58) Field of Classification Search
CPC . H04L 63/0876; H04L 63/0428; H04L 43/04; H04L 43/028; H04L 9/0643; H04L 9/3236
See application file for complete search history.

(56) References Cited

U.S. PATENT DOCUMENTS

| | | |
|---|---|---|
| 2008/0022374 A1 | 1/2008 | Brown et al. |
| 2014/0337614 A1 | 11/2014 | Kelson et al. |
| 2016/0119287 A1 | 4/2016 | Khazan et al. |
| 2018/0234341 A1 | 8/2018 | Ignatchenko |
| 2018/0324153 A1* | 11/2018 | Althouse ............. H04L 63/0876 |

\* cited by examiner

*Primary Examiner* — Kyung H Shin
(74) *Attorney, Agent, or Firm* — Alpine Patents LLC; Brian Van Osdol

(57) ABSTRACT

A system and method that includes receiving a client data packet from network traffic with a client device; extracting a set of packet components from the client data packet; generating a client fingerprint from the set of packet components; assigning a client type to the network traffic using the client fingerprint; and optionally filtering the network traffic of the client device based at least in part on the client type.

22 Claims, 11 Drawing Sheets

Client Hello Message

```
ProtocolVersion client_version;
Random random;
SessionID session_id;
CipherSuite <client cipher suite list>;
CompressionMethod <compression methods list>;
Extension <extension list>
``` cipherSuisteHash = hash(<client cipher suite list>)

compressionMethodsHash = hash(<compression methods list>)

extensionsHash = hash(<extension list>)

client_fingerprint = hash( cipherSuisteHash, compressionMethodsHash, extensionsHash )

client_fingerprint
FEF417DFB97DF4EC8715382CE80770A1

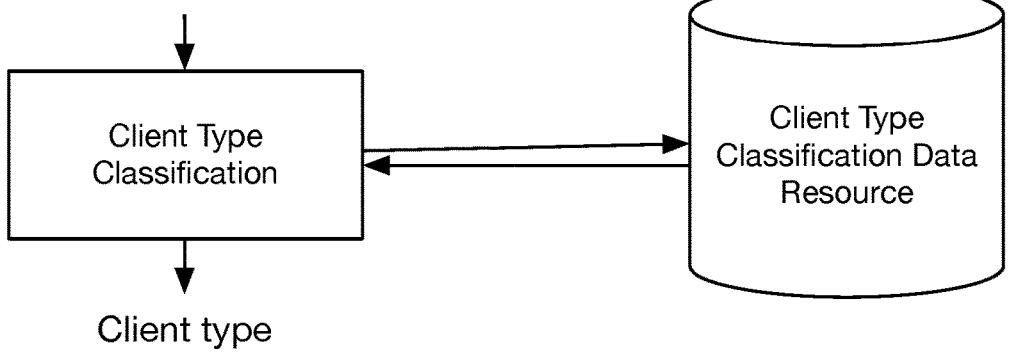

Client type

FIGURE 8

SYSTEM AND METHOD OF FILTERING INTERNET TRAFFIC VIA A CLIENT FINGERPRINT

CROSS-REFERENCE TO RELATED APPLICATIONS

This Application claims the benefit of U.S. Provisional Application No. 62/785,703, filed on 28 Dec. 2018, which is incorporated in its entirety by this reference.

TECHNICAL FIELD

This invention relates generally to the field of network traffic regulation, and more specifically to a new and useful system and method for filtering internet traffic via client fingerprint.

BACKGROUND

Internet security has been an issue since the internet has been publicly available. Policies and practices have been adopted to prevent and monitor unauthorized access, misuse, modification, and disruption of computer networks and network-accessible resources.

Along those lines, solutions for HTTP traffic filtering have existed for some time. Methods and protocols exist to identify undesirable client traffic and block or filter them out. Unfortunately, many techniques exist to fake a user's identity, particularly by spoofing or hiding the source of the client traffic. These countermeasures have developed such that faking a user's identity and avoiding filtering protocols have become commonplace. Common examples of countermeasures include rewriting information in network traffic at the application layer and sending traffic through a proxy and implementing a VPN (Virtual Private Network).

Many internet-based services and platforms are intended for consumption and use by regular users. These regular users will generally use widely available client devices to access and use the service or platform. However, various entities may build their own scripts or computer implemented solutions for accessing a service or platform. These computer-implemented clients can sometimes be candidates for network filtering because of unintended use of a service or platform. However, it can be challenging in some cases to identify such computer-implemented clients when they present themselves as a common client device.

A system and method is needed that can identify clients at a higher level of sophistication, that makes spoofing or hiding a client identities significantly more difficult and not easily implementable. Thus, there is a need in the field of network regulation to create a new and useful system and method for filtering internet traffic. This invention provides such a new system and method.

BRIEF DESCRIPTION OF THE FIGURES

FIG. 8 is a schematic representation of generating a client fingerprint and determining a client type from the client fingerprint of one variation;

DESCRIPTION OF THE EMBODIMENTS

Figure 1:
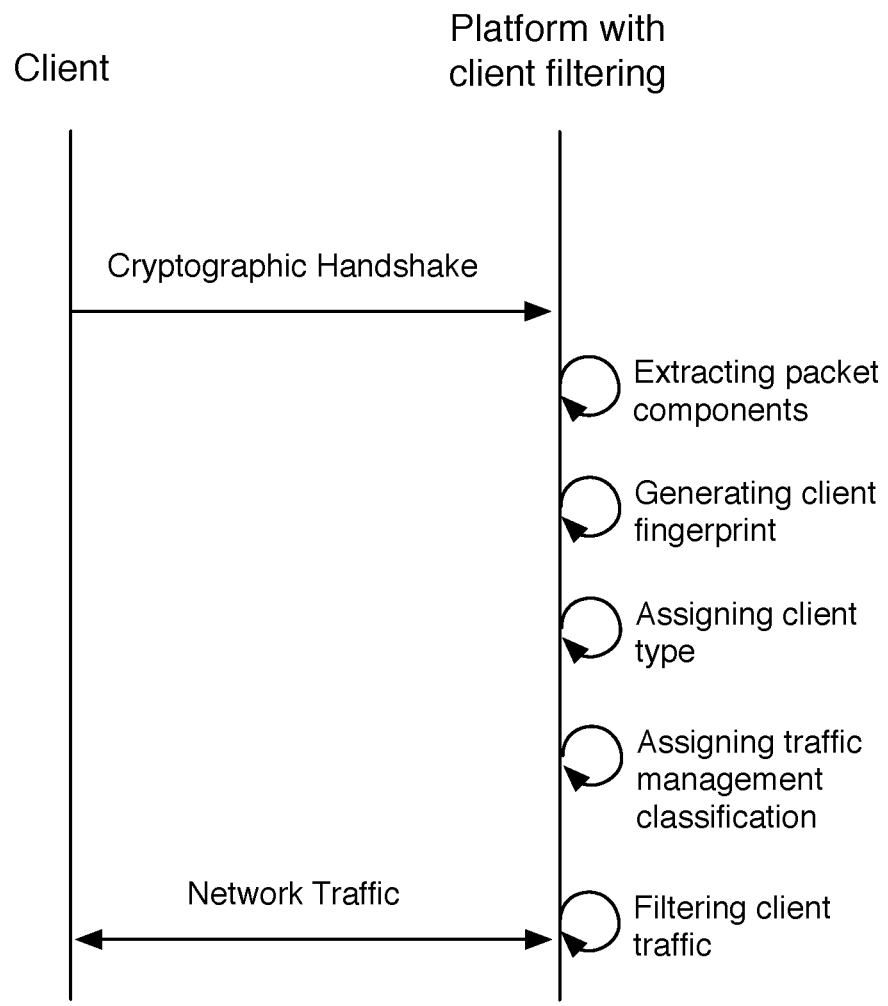
FIG. 1 is a communication flow diagram of one exemplary implementation of the system used within a computing platform.

The following description of the embodiments of the invention is not intended to limit the invention to these embodiments but rather to enable a person skilled in the art to make and use this invention.

1. Overview

A method and system of filtering internet traffic of a preferred embodiment, functions to use an underlying security protocol used to secure internet traffic as a channel for client classification. A method and system preferably operates by receiving a client data packet, extracting a set of packet components from the client data packet, generating a client fingerprint from the client data packet, and assigning a client type using the client fingerprint. The client type may further include giving the client a traffic management classification and the method and system may further include filtering the client traffic dependent on the client traffic management classification.

The method and system can preferably classify or otherwise characterize a client and/or client type by examining lower-level abstraction data from the client that is not necessarily controllable or as easily changeable by the client. Referring as an approximation to the network TCP/IP model, most client-controlled data is in the application layer. The method and system preferably utilizes client-identifying data from lower level layers (e.g., transportation layer) to generate a distinguishing client fingerprint. Many applications or scripts will make use of lower-level libraries that manage and negotiate internet security such as that provided through TLS (Transport Layer Security) or SSL (Secure Sockets Layer). Herein, reference will be made to TLS/SSL to imply that TLS or SSL may be used. Any version of TLS or SSL may be used and similarly derivative protocols or similar cryptographic protocols or other protocols may be used. The system and method can establish a client fingerprint from network traffic relating to such low-level communication. In one preferred variation, the system and method leverages the client hello data packet used in the TLS (Transport Layer Security) or SSL (Secure Sockets Layer) handshake protocols. The hello data packet is preferably used in forming a client fingerprint based in part on the content, organization, and/or structure of the data packet. This client fingerprint may circumvent many client spoof and obfuscation techniques that are primarily application layer manipulations. The client fingerprint may then be utilized to determine and characterize the client type, thereby enabling appropriate management and/or filtering of the client traffic.

The system and method may provide a number of potential benefits. The system and method are not limited to always providing such benefits, and are presented only as exemplary representations for how the system and method may be put to use. The list of benefits is not intended to be exhaustive and other benefits may additionally or alternatively exist.

One potential benefit of the method and system is that a client fingerprint, as described herein, is sufficient to distinguish the client type. The client fingerprint may thus provide the necessary information to identify the type of actor that the client is, thereby enabling an appropriately desired response to the client. The client fingerprint may be used in identifying both good and bad actors.

Another potential benefit is that the client fingerprint may distinguish a client type with a high level of confidence. As the client fingerprint is determined from data components that are typically immutable through typical application development practices, the method and system may enable identifying a user reliably and consistently. Since a significant amount of information used to generate a client fingerprint comes from beyond the application layer, the ability for an actor to manipulate the client fingerprint becomes more difficult and therefore will more reliably reflect the true client type. Although not impossible to spoof, the client fingerprint provides a significantly more difficult detection technique for the client to manipulate as compared to current client detection techniques.

Another potential benefit is that using a VPN (Virtual Private Network) or a proxy, two of the most common ways a client may attempt to obfuscate its identify, does not hinder the method and system from distinguishing a client type. Since the data components utilized are significantly in the transport layer (e.g., TLS hello client), the client fingerprint is maintained and not altered by connecting through a proxy or utilizing a VPN.

Another potential benefit is that the method and system may also enable non-intrusive filtering. The system and method can preferably be implemented without needing to actively regulate incoming traffic, and instead may be passed the appropriate network traffic for analysis. Since a client type is identified at the point of connection with a server, client activity is not hindered by constant filtering or monitoring during activity. The client may be immediately admitted, rejected, or given appropriate access from the initial state, thereby not affecting client activity through constant monitoring. This may improve the performance of a computer-implemented service provided over the network. It similarly may reduce the computational resources needed for network monitoring.

As another potential benefit, the method and system may additionally afford a level of privacy for the client and for the activity of the client. Data required for the implementation of the method and system, although distinguishing the client, does not expose any user personal data or user personal activity that is passed along through the client such as information that may be exposed in HTTPS traffic (or other suitable types of application protocols). This may be particularly useful when the system and method are implemented as a service, and the user of the service does not want a third-party having access to such information. Since no user data or user activity is used, data required for the implementation of the method and system may be freely transferred with minimal privacy concerns. For example, a third-party system may supply the requested portion of network traffic (e.g., a TLS hello client packet) used in generating the client fingerprint without the third-party system exposing sensitive client traffic. Therefore, the third-party system can mitigate security and privacy risk of using such a network filtering service.

Figure 3:
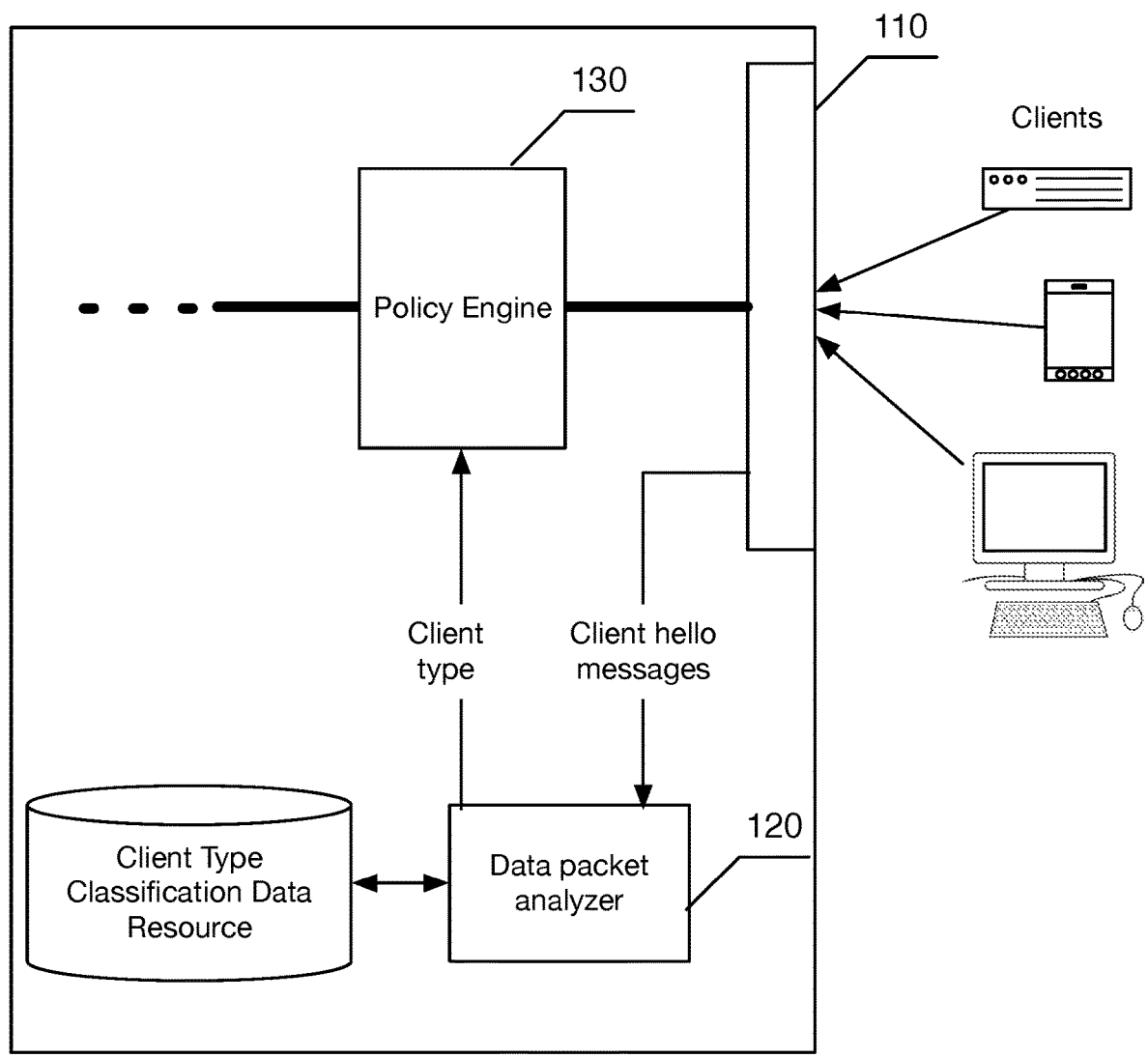
FIG. 3 is a schematic representation of a system of a preferred embodiment.

The method and system may have particular applicability for any person and/or organization that maintains a web service that has any type of concern over client traffic. A software application or service may apply an implementation of the system and method to address concerns related to security concerns (e.g., for banks, shopping sites), site misuse (e.g., bots taking over ticket sites, data mining websites), undesired traffic (e.g., PC users connecting to a mobile app site), and/or other suitable types of concerns relating to understanding and managing clients. As shown in FIG. 1, in one exemplary implementation of the system, a software platform may be configured to receive a client data packet, extract a set of packet components from the client data packet, generate a client fingerprint from the set of packet components, and assign a client type using the client fingerprint. Client type may be used to filter network traffic or take any suitable action. In one example, an online institution may use an implementation of the system to monitor the client type of clients connecting to the user-facing web services and appropriately regulate access by non-user clients as shown in FIG. 3.

Figure 2:
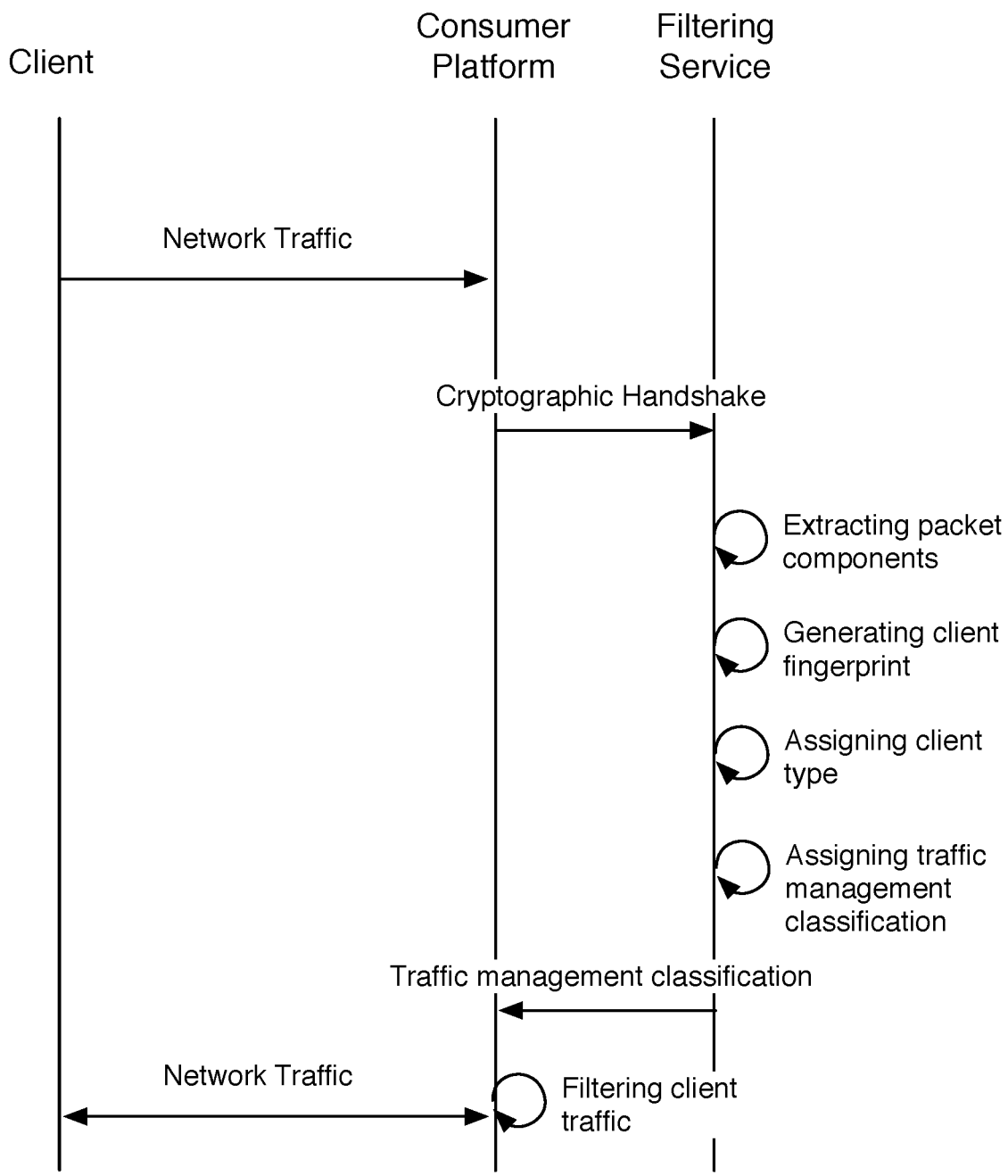
FIG. 2 is a communication flow diagram of exemplary implementation of the system as a filtering service.
Figure 4:
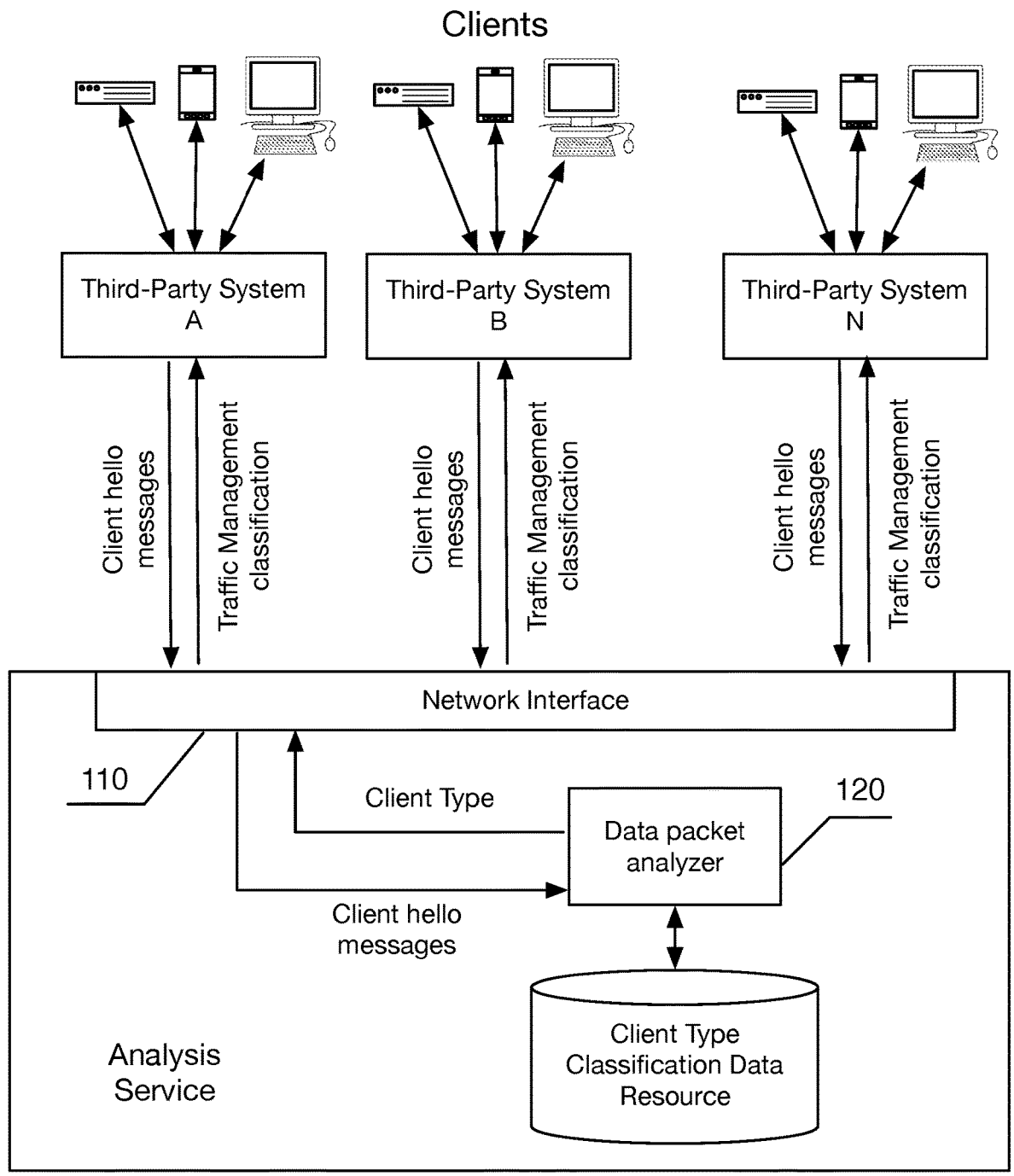
FIG. 4 is a schematic representation of a variation of the system as an analysis service.

Alternatively, the system and method may be implemented as a web traffic analysis and/or client filtering service. That is, a filtering service provider offered as an application programming interface (API) service may identify and/or filter client traffic to address security concerns, site misuse, and any other type of undesired traffic. The service is preferably offered as a multitenant service such that multiple businesses and applications can be consumers of the filtering service as shown in FIG. 4. A consumer could be any suitable type of entity with a computing infrastructure that has client traffic. Consumers could include platforms or services such as a bank, a shopping site, online auction site, online gaming site, ticket sales site, another API service provider, and/or any suitable type of platform or service. As shown in FIG. 2, in an alternative exemplary implementation of the system, a consumer will receive client traffic and specifically network traffic like a TLS/SSL hello client packet. The TLS/SSL hello packet will be passed to the filtering service for inspection. Having received the specified network traffic, the filtering service can similarly extract a set of packet components from the client data packet, generate a client fingerprint from the set of packet components, and assign a client type using the client fingerprint. The assigned client type can be passed back to the consumer. Additionally or alternatively, a recommended handling of the network traffic can be provided. For example, the filtering service can specify traffic handling suggestions such as indicating to treat it as legitimate traffic, block traffic, through a particular type of error for the network traffic, or to take any suitable type of action appropriate for the client type. In another example, an online ticketing agency may pass traffic to a filtering service to filter client traffic to identify and block automated bots from purchasing tickets. Alternatively, the filtering service may identify the bots for the ticketing agency enabling the ticket agency to take their own desired action regarding the bots.

Systems of a preferred embodiment may additionally include a client fingerprint database where data related to the various types of client fingerprints is managed. Data related to the client fingerprints may include a more general classification such as labeling as a particular type of computing device (e.g., specifying a brand/model of smart phone), activity data, and/or other suitable forms of data.

2. System

As shown in FIG. 3, a system for filtering internet traffic via a client fingerprint of a preferred embodiment can include a network traffic data interface 110, a data packet analyzer 120, and optionally a policy engine 130. The system can be used to regulate and manage network traffic. In alternative variations, the system may be used for the collection and monitoring of network traffic through a combination of the network traffic data interface 110 and the data packet analyzer 120.

As discussed above, the system preferably leverages the TLS/SSL handshake protocol during data packet analysis when determining a client type. An identified or classified client type may be used in determining how other client network traffic is managed by the policy engine 130. The system may be implemented internally within a computer-implemented system that has network traffic.

In an alternative variation, the system for filtering internet traffic via a client fingerprint is implemented as a client traffic analysis service that can be used by one or more third-party computer implemented systems. As shown in FIG. 4, a client traffic analysis service may include a network traffic data interface 110 (for receiving appropriate network data packets from external third-party systems) and a data packet analyzer 120. The analysis service can preferably communicate back to the appropriate third-party system results of the client analysis such that the third-party can enforce their own network traffic policy or perform any suitable business logic. The analysis service may be implemented as a multitenant computing platform. The multitenant platform may include a user account system that includes user database and/or data records. The user account system can additionally be used in facilitating authenticating and allowing external third parties with an account to supply appropriate network traffic data through the network traffic data interface 110.

The network traffic data interface 110 functions as a conduit for collecting the appropriate network traffic data packets for analysis. As mentioned above, the system may not require significant amounts of network traffic from a client to appropriately regulate all network traffic from a client. The network traffic data interface 110 as described may be directly integrated into the network traffic of a computing system and/or indirectly access appropriate portions of the network traffic.

Preferably, the data interface 110 is used to collect data messages exchanged as part of cryptographic protocol to establish and provide secure communications between a client device and a server. In this case, the server will typically be the computing system using the system and the client will be an external computing device trying to connect to the computing system. In particular, the negotiation phase of the cryptographic protocol can be used. A preferred variation is applied to TLS/SSL or other similar cryptographic protocols. In TLS/SSL, the client hello message (i.e., a ClientHello message) is preferably collected as the network traffic sample from a client. The Client hello is generally the initial message (i.e., data packet) sent by the client during the negotiation during the TLS/SSL handshake. The client hello message will generally include, announce, and/or otherwise specify supported protocol version info (e.g., current version number of TLS/SSL), a list of cipher suites supported by the client in order of client preference, and a random byte string. The client hello message may additionally include a list of suggested compression methods, a session ID, and if the client can use Application-Layer Protocol Negotiation. The client hello message may additionally include a list of supported application protocols and/or client-supported extensions. The client message may further include additional information.

In a first variation, the network traffic data interface 110 is integrated into the controller for network traffic of the operating system. In other works, the network traffic data interface 110 may be directly integrated or built as part of the computing device and/or application/software used in receiving and processing network traffic from external client devices.

In another variation, the network traffic data interface 110 is an external system that operates in cooperation with another computing device and/or application/software used in receiving and processing network traffic from external client devices. In this variation, the data interface 110 is used to directly or indirectly access appropriate portions of the network traffic. The appropriate portions of the network traffic (e.g., the TLS client hello messages) may be sent from a system processing the network traffic. Alternatively, the data interface 110 may fetch the appropriate data packets.

In a variation for indirect access to the network traffic, the network traffic data interface 110 may be implanted as part of a network traffic analysis service. As such the network traffic data interface no may be an application programming interface (API). The API is preferably configured for requesting analysis of client network traffic. In one preferred implementation, a third party can submit a sample client hello packet through the API to the system. In response (either a direct response to the API request, provided through a callback URI, or supplied through any suitable mechanism), the system may provide a classification of the client hello packet (e.g., indicating the type of device and/or if it appears to be legitimate client traffic.

The data packet analyzer 120 functions to process a data packet and determine a client fingerprint and then optionally classify the fingerprint. The data packet analyzer 120 preferably includes one or more computer-readable mediums storing instructions (or other forms of configuration) that, when executed by the one or more computer processors, cause a computing platform to: extract a set of packet components from the client data packet; generate a client fingerprint from the set of packet components; and assign a client type to the network traffic using the client fingerprint. The data packet analyzer 120 preferably perform any operation or variation described below as it relates to extraction of components, generating of a client fingerprint and user of the fingerprint to assign a client type. The data packet analyzer 120 preferably these operations on a client data packet that is a client hello message received during negotiation during a transport layer security (TLS) protocol.

Configuration/instructions to extract the set of packet components preferably include configuration/instructions to extract identifying data from a client cipher suite list, a list of compression methods, the client point formats, the list of supported application protocols, and/or the list of client-supported extensions from the client hello message.

Configuration/instructions to generate the client fingerprint will preferably include configuration/instructions to encode the set of packet components into the client fingerprint as a character representation. Furthermore, configuration/instructions to encode the set of packet components will preferably include configuration/instructions to hash the client cipher suite list, hash the list of compression methods, hash the client point formats, hash the list of supported application protocols, and/or hash the list of client-supported extensions.

Configuration/instructions to assign the client type to the network traffic using the client fingerprint will preferably include configuration/instructions to select the client type from a database mapping client fingerprints to a classification of client type. The system and more specifically, the data packet analyzer 120 may further include a client type classification data resource. This can be a database or collection of databases used to map and/or classify a client fingerprint with a client type. In one variation, the client fingerprint can serve as an index used to query the data resource to determine a pre-established client type label. Alternatively, the data resource may be used as a model used in classifying the client fingerprint.

The policy engine 130 functions to manage the network traffic based in part on the output of the data packet analyzer 120. In general, the policy engine 130 can is preferably a computer and/or circuit implemented device that includes configuration that when executed cause the policy engine 130 to permit network traffic restrict network traffic, and/or block network traffic with a client based on the client type output from the data packet analyzer 120.

3. Method

Figure 5:
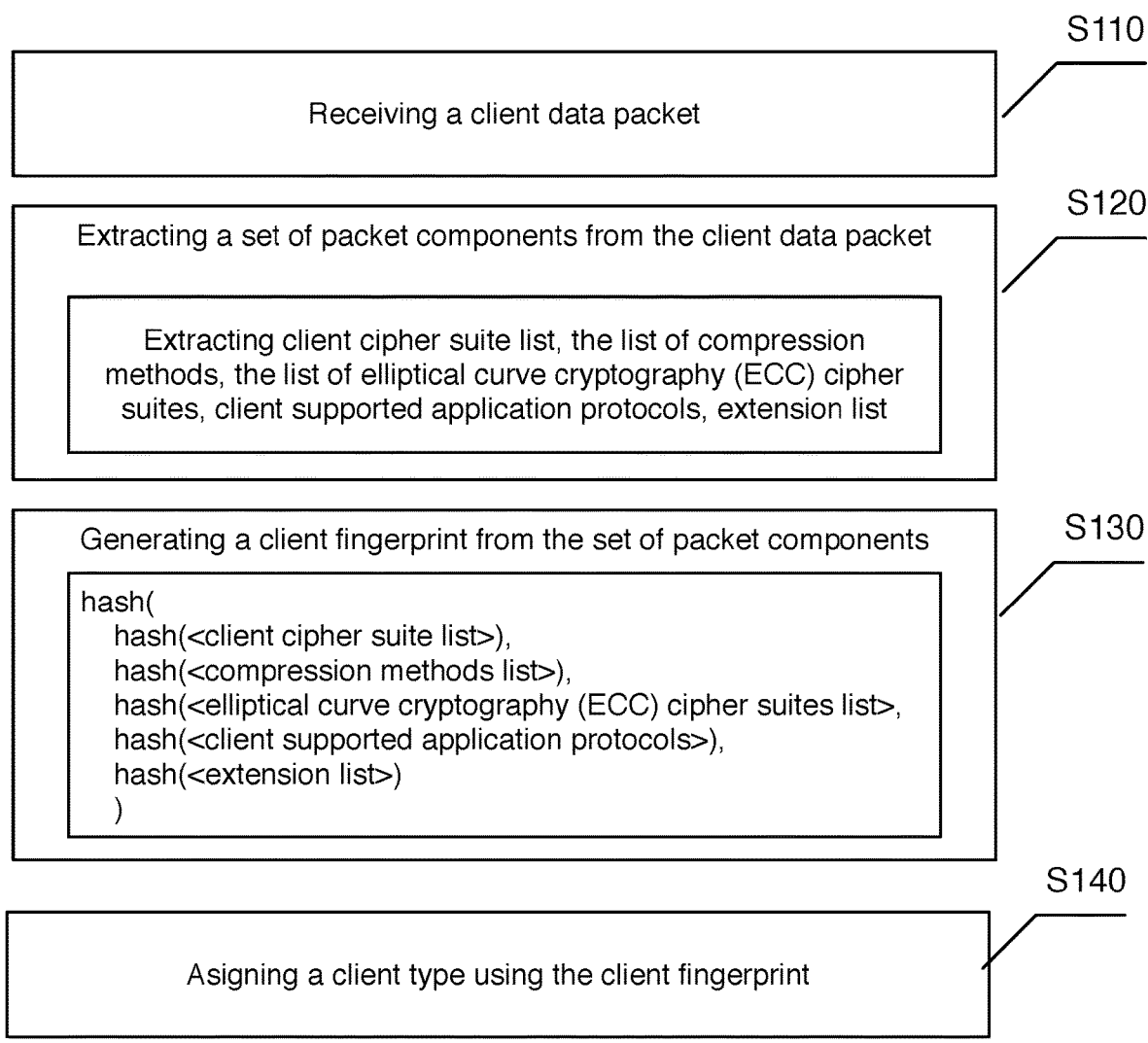
FIG. 5 is a flow diagram of a method of a preferred embodiment.
Figure 6:
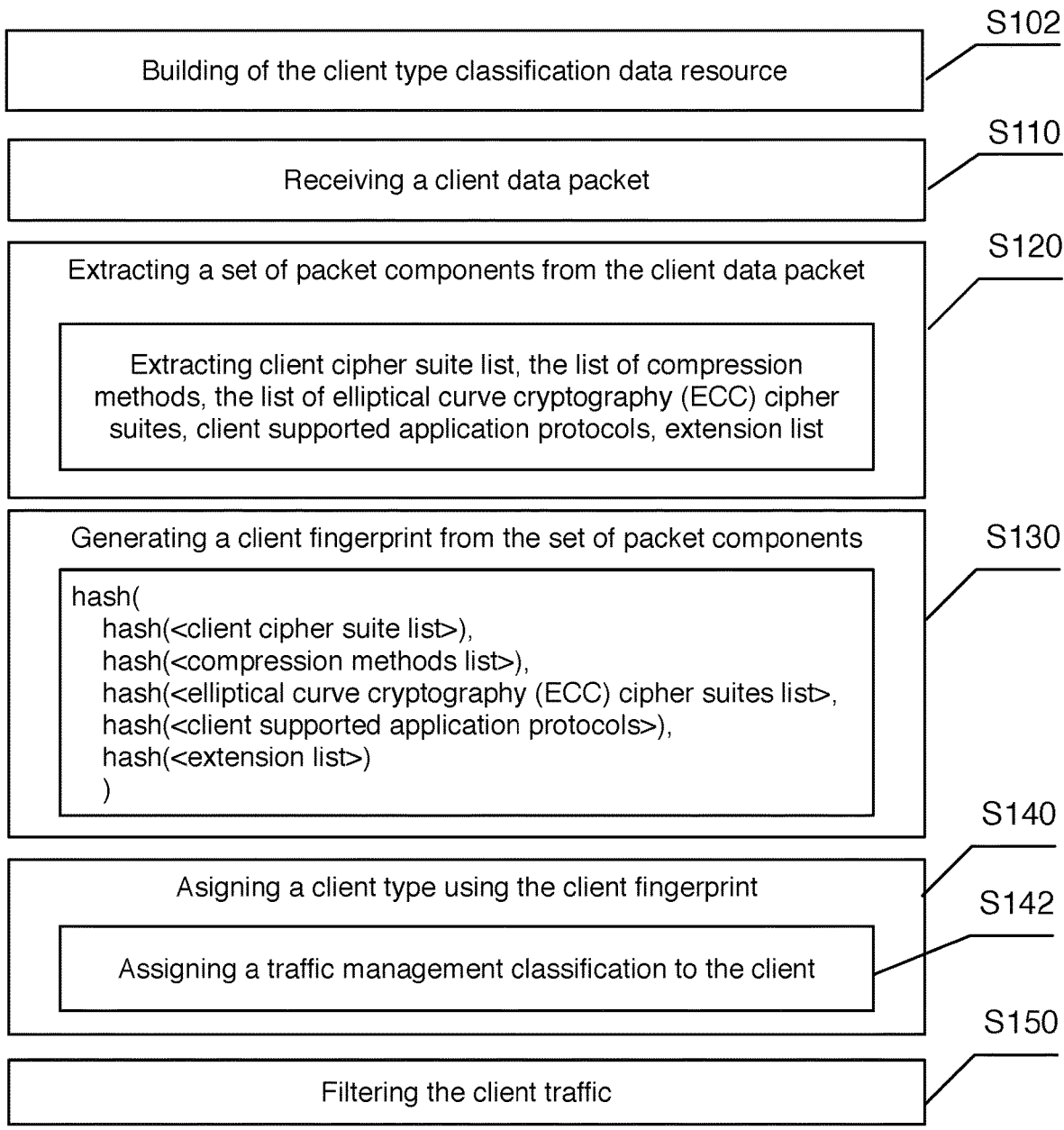
FIG. 6 is a flow diagram of a variation of the method with filtering of client traffic.

As shown in FIG. 5, a method of filtering internet traffic may include receiving a client data packet S110, extracting a set of packet components from the client data packet S120, generating a client fingerprint from the set of packet components S130, and assigning a client type using the client fingerprint S140. Assigning a client type may include giving the client a classification, which may include assigning a traffic management classification to the client S142 as shown in FIG. 6. The method may function in classifying and labeling network traffic by a set of clients. The method for example, may be able to more accurately identify the types of clients used to access a network-accessible service. The network-accessible service may further analyze the activity of those clients to understand how different clients behave. This client type classification is preferably resilient to attempts by a client to masquerade or present itself as a client type other than the one it actually is, thereby the method provides more accurate client type classification.

The method may additionally or alternatively function in classifying clients to enable filtering of client traffic. The method may further include filtering the client traffic depending on the client type such as by filtering on a traffic management classification associated with the client type of a particular client.

In one implementation, the method may be implemented as a network filtering solution within an application or service such as shown in FIG. 1. In such an implementation, the accessing of the client data packet may be performed directly on the network traffic with the network-accessible service. Similarly, the filtering of the traffic may be performed directly by the network-accessible service. In another implementation, the method may be implemented as a network filtering solution offered as a filtering service to one or more consumers of the service as shown in FIG. 2. The client data packets from the network traffic that are used for generating the client fingerprint may be supplied by an outside third-party. Similarly, traffic management classifications or other recommendations for network traffic filtering may be executed by the external systems. However, some variations may include a policy engine operable within a third-party system to facilitate the filtering (e.g., a library or framework containing machine instructions configured for appropriately filtering traffic).

Preferably, the method is implemented in the context of a client data packet exchanged during the handshake negotiation of a cryptographic protocol. The client data packet more specifically is a client hello data packet communicated by the client device prior to establishing encrypted communication between the client and the server. The client hello data packet preferably serves as a client-provided description of client security configurations. The client security configurations can describe the types and/or versions of cryptographic protocols supported, the list of cipher suites, compression methods, supported application protocols, extensions, and/or other features. These various data packet components may be ordered by client preference and/or priority. In one preferred variation, the cryptographic protocol is a TLS/SSL protocol and the ClientHello data packet is the TLS/SSL client hello message communicated when establishing or re-establishing a TLS/SSL session. Since the client data packet is exchanged during the handshake portion of the negotiation to establish a secure session, the data packets are exchanged in an unencrypted format (e.g., in plain text).

Figure 7:
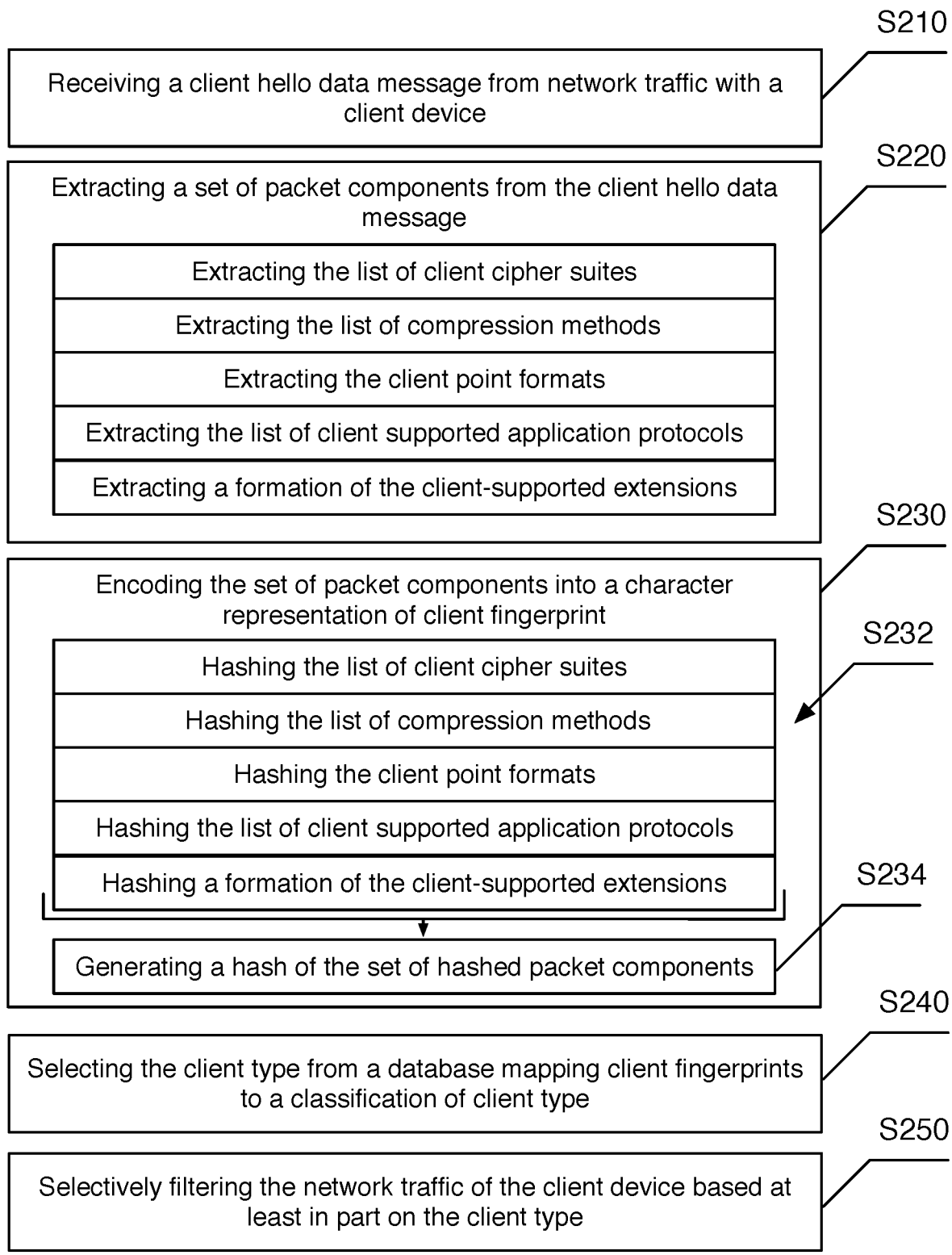
FIG. 7 is a detailed flow diagram of a method applied to TLS/SSL protocol.

In the variation where the method is implemented for use with a TLS/SSL protocol, client data packet is preferably a client hello message received during negotiation during TLS/SSL handshake protocol. Accordingly, the method may be implemented as shown in FIG. 7, which comprises of: receiving a client hello data message from network traffic with a client device S210; extracting a set of packet components from the client hello data message, where the set of packet components may include the supported version of TLS/SSL protocol, a list (e.g., a prioritized list) of client cipher suites, a list (e.g., a prioritized list) of compression methods, client point formats, list of client supported application protocols, and/or a list of client-supported extensions S220; encoding the set of packet components into a character representation of client fingerprint S230, which comprises of individually generating a hash of a set of packet components S232 (e.g., hashing each selected packet component) and generating a hash of the hash of the set of packet components S234 (e.g., hashing the hashes resulting from the S232); and selecting the client type from a database mapping client fingerprints to a classification of client type S240. The method may additionally include selectively filtering the network traffic of the client device based at least in part on the client type S250. More specifically, S232 and S234 is implemented by individually applying a hash operation to each of the set of packet components to generate a set of hashed packet components and then applying a second hash operation to the set of hashed packet components to generate the client fingerprint. The type of hash operations applied can be the same but may alternatively be different types of hash operations or other encoding operations. Generating the hashes of the set of packet components can include hashing the list of client cipher suites, hashing the list of compression methods, hashing the client point formats, hashing the list of client supported application protocols, hashing a formation of the client-supported extensions, and/or hashing any suitable packet component or feature. Alternatively, the client type information may be supplied or reported for appropriately action. The processes S210, S220, S230, S240 and S250 preferably correspond to and may include any variation described in S110, S120, S130, S140, and S150. Furthermore, encoding the set of packet components into the character representation of a client fingerprint may comprise of hashing the collection of hashed packet components as shown in FIG. 8.

Figure 9:
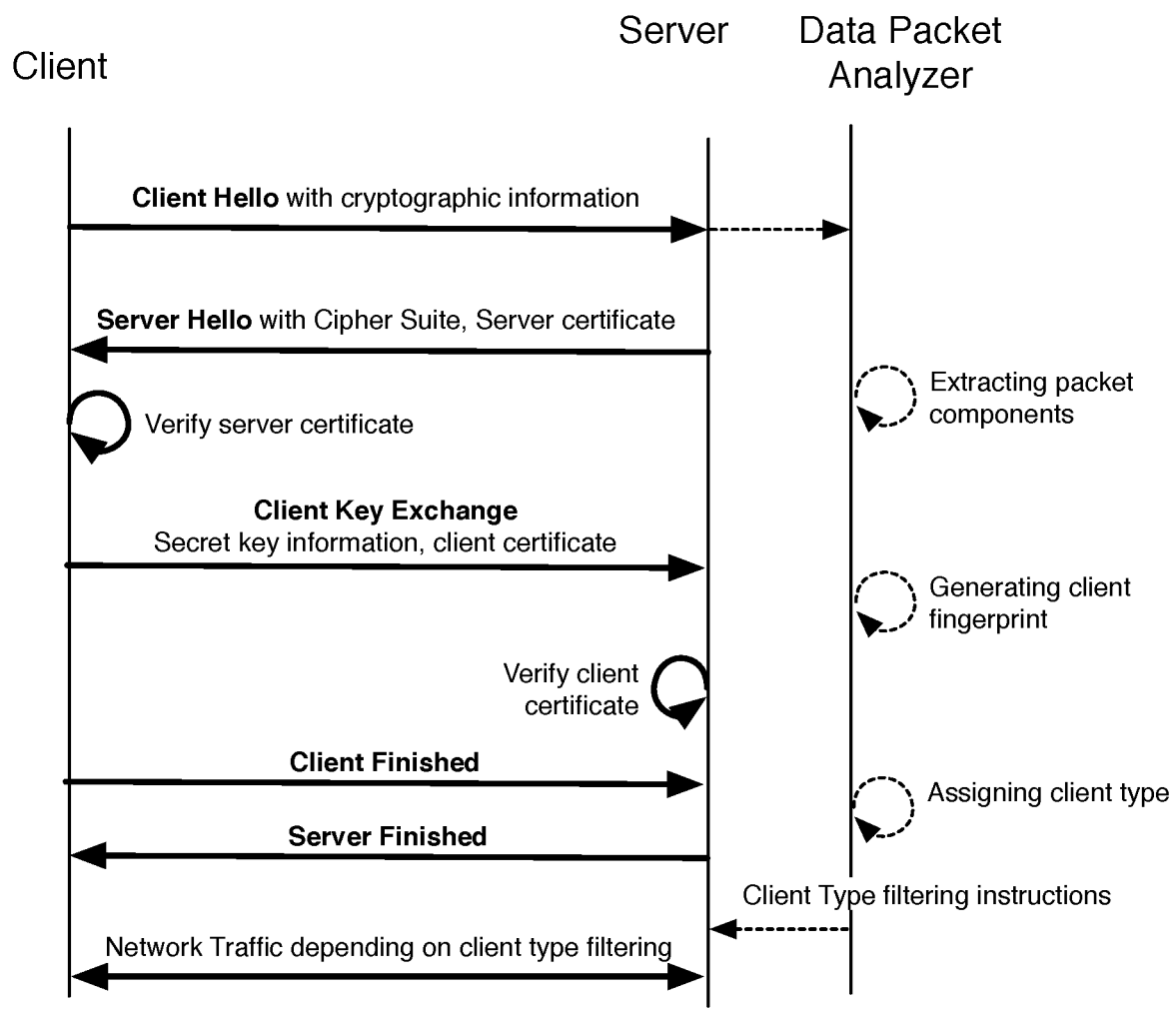
FIG. 9 is a schematic representation of the method performed in parallel to a TLS handshake protocol.

The processing of the client hello may be performed in parallel to the TLS handshake protocol. As shown in FIG. 9, analysis and determination of the client type can performed independent and in parallel to the TLS handshake protocol, which includes the server receiving a client hello message containing cryptographic information of the client; sending of a ServerHello message from the server containing the cipher suite, server certificate, and optionally a client certificate request; receiving client key exchange message that includes secret key information encrypted with server public key; receiving the client certificate; verifying client certificate if required; receiving client finish message; sending server finished message; and then exchanging messages encrypted with a shared secret key.

Alternatively, the analysis of the client hello may be performed synchronous to the TLS handshake protocol such that the server response and actions during the TLS handshake protocol may be modified based on the client type.

Figure 10:
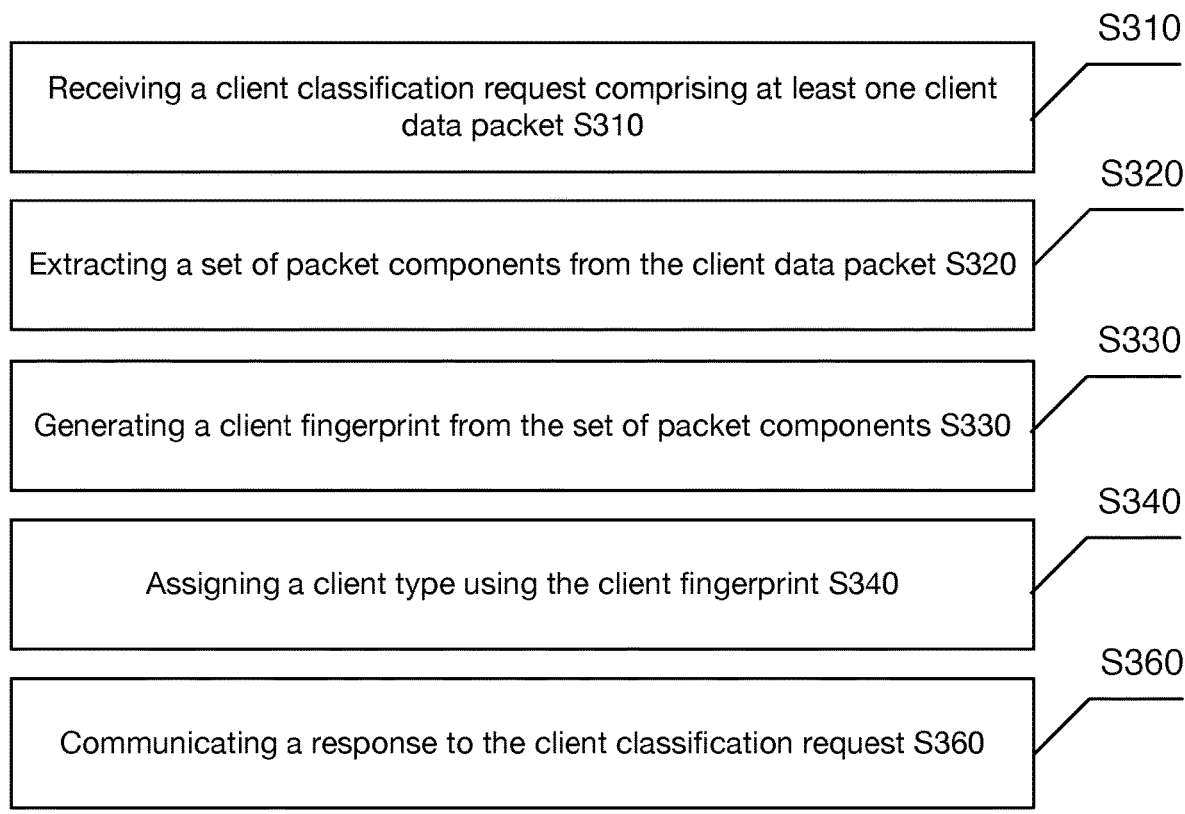
FIG. 10 is a flow chart representation of the method implemented as an analysis service.

In the variation where the method is implemented as an analysis service for analyzing and filtering of network traffic of external third-party systems, the method may be implemented as shown in FIG. 10, which comprises of receiving a client classification request comprising at least one client data packet S310, extracting a set of packet components from the client data packet S320, generating a client fingerprint from the set of packet components S330, and assigning a client type using the client fingerprint S340, and communicating a response to the client classification request S360. The processes S310, S320, S330, and S340 preferably correspond to and may include any variation described in S110, S120, S130, and S140. The response preferably includes the client type information. In one variation, the processes may be performed as part of a request and response sequence facilitated by an API of the analysis service (e.g., a REST API, GraphQL API, etc.). In another variation, the initial request may be submitted with a callback URI. The response can be supplied by sending a communication to the specified callback URI. Any suitable approach to receiving a request for client type analysis and supplying the results may alternatively be used.

The client fingerprinting technique provided by the method can serve as a reliable signal for the type of client. In other words, clients of the same type—that is to say, client devices that are the same model of physical computing device with same or similar versions of an operating system, and/or using the same or similar versions of an application or software will generally yield the same or a similar client fingerprint. The method is preferably implemented having access to a data resource that maps client fingerprints to client type classifications. In some variations, the method can include building of the client type classification data resource S102 as shown in FIG. 6.

Block S102, which includes building a client type classification data resource, functions to generate a database or data model whereby a client fingerprint may be used to assigning or determining a client type. The client type classification data resource is preferably constructed from collecting the client fingerprints from a large number of clients and then appropriately assigning classifications and/or labels to the client fingerprints. In one variation, the client type classifications may be specifically tied to a client descriptor. A specific client descriptor may identify the model of the device, the version of operating system, the type and/or version of application or software functioning as the client. The client type classifications or at least a subset of classifications may be more general such as "legitimate client device", "computer-controlled client device", "scripted client device", and/or other suitable labels.

Building the client type classification data resource may include collecting a large volume of client data packets, processing them through the analysis of the process involving S120 and S130, and then labeling the resulting client fingerprints. The large volume of client data packets may include collecting greater than ten thousand, greater than hundred thousand, and/or greater than a million or even greater than ten or hundreds of millions of client data packets.

In one variation, labeling (at least in part) may be performed manually. Preferably, labeling may be prioritized based on the number of occurrences, frequency of occurrences, rate of occurrences or other suitable metrics quantifying the client fingerprints detected in the sample of client data packets. For example, the client fingerprinting process may be configured such that approximately one hundred to a thousand different client fingerprints will generally be encountered across a large volume of client traffic (hundreds of thousands to millions of clients). And the more popular ones and/or rising client fingerprints can be labeled.

Additionally or alternatively, automated systems can facilitate the labeling. Such automated systems may include automatically labeling client fingerprints using a machine learning model, statistical model, and/or any suitable algorithmic approach.

As above, an automated system may determine when a client fingerprint should be labeled. The client fingerprints commonly encountered will generally be from legitimate traffic and may deserve labeling accordingly. Additionally or alternatively, a simple classification approach may be applied that labels client fingerprints based at least in part on the quantity of occurrences within a sample set.

Similarly, an automated process may be employed as part of building the client type classification data resources that includes detecting and/or notifying of new legitimate client types. For example, when a new device or application is introduced, a notification or alert may be generated. A new device may be detected by identifying an increase in the frequency of occurrence of a new client fingerprint.

As another automated process to facilitate to assist, building the client type classification data resource may include comparing a client fingerprint to a presented client type. Here the client type may be presented in another portion of communication from the client device. For example, the presented client type could be the stated user agent header. Patterns in user agent headers as they map to a client fingerprint may be used to automatically associate a client fingerprint with a user agent label. In some cases, a type of user agent may be associated with one or more expected client fingerprint. If the client fingerprint does not match the expected client fingerprint based on the presented user agent, then this can signal that a) a change in the user agent has introduced a new client fingerprint or b) the client is acting in bad faith by claiming a false user agent. In the case of a), the new client fingerprint may be monitored or selected for labeling. In the case of b) this may contribute to classifying the client type as one to monitor or flag for possible illicit behavior. For example, if one client fingerprint is frequently reported as different user agents it may be taken as a signal that the actual client type is one used for illicit use.

If implemented as an internal solution by a computer implemented service or application, the method may include monitoring activity originating from a client and applying a classification based at least in part on client activity with the service or application. Monitoring activity can be used in detecting patterns in higher-level activity from a client such as types of actions performed, amount of activity, detecting and/or classification of activity associated with human activity (e.g., user interface interaction). Preferably, once a client fingerprint is confidently associated with a client type classification, inspection and/or analysis of user activity can be avoided, and the client fingerprint can be sufficient. Such analysis may be useful when initially assigning a classification.

In variations where the method is not implemented as an internal solution but is provided as a service, the method may include receiving client labels for client devices from third-party systems. In other words, the systems using the analysis service may report their own classification of particular users, which may be used to update the client type classification data resource for the client fingerprint that was detected for that client device. For example, if a user account from a client device was determined to be performing fraudulent or undesired activity with a computer service, then that client fingerprint may be flagged accordingly. In some cases, a single occurrence may not be sufficient for updating a client type. However, if an established pattern is detected then the client type associated with a client fingerprint may be updated.

Block S110, which includes receiving a client data packet, functions in acquiring appropriate client related network traffic. The client data packet is preferably from network traffic with a client device. The client data packet preferably includes communication protocol information regarding the client. Preferably, the client data packet includes client specific information that may distinguish a client. The client data packet may optionally not include application-specific functional data that may be part of HTTP/S traffic. Though, in some variations, such data may be collected. In preferred variations, the client data packet includes at least part of the initial client/server handshake used in cryptographic protocols, but may include additional information. The initial client/server handshake in a cryptographic protocol is generally part of a lower-level implementation that is more challenging to manipulate. The initial handshake additionally may have a number of components that are more accessible as the cryptographic communication has not been established at that point and the data is not encrypted. The client data packet is preferably a client hello message received during negotiation during a cryptographic protocol. As discussed above, the cryptographic protocol is preferably a TLS/SSL protocol. In a preferred implementation, the client data packet is a TLS client hello message (or SSL client hello message) from the TLS handshake protocol between a client and server to establish a secure connection. The client hello message originates from the client.

Preferable implementations of the client data packet include any version of the TLS (or SSL) client hello message. See, e.g., "The Transport Layer Security (TLS) Protocol Version 1.2," RFC 5246, August 2008. The client hello message may contain the current version number of TLS (or SSL), a list of cipher suites supported by the client in order of client preference, and a random byte string. The client hello message may include a list of suggested compression methods, a session ID, and if the client can use Application-Layer Protocol Negotiation. The client hello message may additionally include a list of supported application protocols and/or a list of client-supported extensions. The client message may further include additional information.

The client data packet may additionally or alternatively include a client data packet other than the TLS or SSL client hello packet. The client data packet may comprise of multiple data packets. For example, the client data packet may include all the data packets of the client side of a TCP handshake for establishing a connection.

Receiving the client data packet may be performed by directly accessing the network traffic to a server. Alternatively, receiving the client data packet may include receiving a client classification request comprising at least one client data packet, wherein the analysis of network traffic by a client is performed for external network traffic as discussed above. In some variations, receiving of client data packet related data is performed in substantially real-time. For example, the client data packet may be accessed and communicated for analysis in response to receiving the client data packet from the client. In some variations, receiving of client data packet related data may be performed asynchronous to the actual client network traffic. For example, analysis of prior network traffic can be performed to assess the client types that have historically accessed a computer-implemented service.

Block S120, extracting a set of packet components, functions in extracting client specific information from the client data packet in order to generate a client fingerprint. Extracting a set of packet components S120 may include extracting, reading, or otherwise accessing one or more components from the client data packet. Preferably, a number of properties are extracted and used in generating the client fingerprint.

Extracting a set of identifying data S120 may extract client data in a non-intrusive way. Preferably, extracted identifying data may be client specific data that can be used to identify the client but without extracting client activity or message data. In this way, a client fingerprint can be generated without needing to access private information, personally identifying information, and/or other private or sensitive data.

The client data packet may include a number of fields. A packet component can be information from one of these fields such as the value of a particular field. In some variations, multiple packet components (or data fields of the client data packet) can be extracted and used. Preferably, the particular packet components that are extracted are preconfigured. The packet components are preferably extracted to preserve their value but also how they are presented (such as the order), as those can be client-identifying signals.

A packet component may include a list of items. For a packet component that is a list of items, extracting a set of packet components S120 preferably includes extracting the order of the list of items. If extracting a set of packet components S120 is applied to a list of items, the order of the items is also preferably extracted by block S120. Depending on the preferred implementation, the order of items may be included in the original packet component or comprise a distinct packet component. Extracting a set of identifying data S120 can include extracting identifying data from the client cipher suite list, the list of compression methods, the list of elliptical curve cryptography (ECC) cipher suites, client supported application protocols, extension list, and/or other properties of the packet(s). For each of these components of identifying data, the specification, the order of the list, the number of items in a list, and/or any suitable property of the particular packet component can be used.

In variations wherein the client data packet is a TLS or SSL client hello message, extracting a set of packet components S120 may include extracting the client cipher suite list. The client cipher suite list is a list of the cipher suites encryption algorithms that the client can implement in order of client preference.

In variations wherein the client data packet is a TLS or SSL client hello message, extracting a set of packet components S120 may additionally or alternatively include extracting the list of compression methods. The compression methods are hashing algorithms that may be implemented to reduce the size of information sent back and forth between the server and client.

In variations wherein the client data packet is a TSL or SSL client hello message and the list of cipher suites includes any elliptical curve cryptography (ECC) cipher suites, the client hello message may additionally include a list of ECC cipher suites the client can support and the point formats the client can parse. In these variations, extracting a set of packet components S120 may additionally or alternatively includes extracting the client point formats.

In variations wherein the client data packet is a TSL or SSL client hello message and the client hello message includes an Application-Layer Protocol Negotiation Extension (ALPN), the client hello message may additionally include a list of client supported application protocols (e.g. Http/2). In this variation, extracting a set of packet components S120 may additionally or alternatively include extracting the list of client supported application protocols.

In variations wherein the client data packet is a TSL or SSL client hello message extra, the client hello message may additionally include a list of client-supported extensions (e.g., server name indication). In these variations, extracting a set of packet components S120 may additionally or alternatively include extracting the list of client-supported extensions.

In variations where the client data packet is a TLS/SSL client hello message, the possible data packets that may be extracted could include a combination of a list of client cipher suites, a list of compression methods, client point formats, a list of client supported application protocols, a list of client-supported extensions, and/or other fields from the hello message. Different variations may use different combinations of packet components and/or alternative packet components.

Additional packet components may be added, removed, or replaced. Examples of other packet components may include: client browser information, detection of a client from a known VPN IP, and client TOR utilization. The method may additionally be implemented for older protocols. For example, on a private network still running older communication protocols, the method may enable building an application list off of the Next Protocol Negotiation (NPN) extension format instead of ALPN, as described above. Additionally, the client announced client type such as the user agent header in an HTTP/S communication may additionally be collected, which may be used for comparison when determining how to handle the client traffic.

Block S130, which includes generating a client fingerprint functions to create a distinguishing client fingerprint. The client fingerprint may or may not be unique. Although not necessarily unique, the client fingerprint is preferably sufficiently distinct as to enable distinguishing between client sub-groups (e.g., particular application users, browser users, particular mobile device users, particular operating system users, programming language connection, bots, and the like).

Generating a client fingerprint S130 preferably encodes the set of packet components into a character representation, heretofore referred to as the client fingerprint. In other words, generating the client fingerprint can include encoding the set of packet components into a client fingerprint as a character representation. The character representation can be a string of alphanumeric characters or a number. Specifically, generating a client fingerprint preferably includes: for each of the extracted packet components, encoding the packet component. In some variations, generating a client fingerprint can additionally include encoding the encoded packet components such that a singular string or number is produced.

Any suitable encoding process may be used. Encoding will preferably be hashing a specified organization of the packet component. In one preferred variation, encoding includes hashing of a representation of the values for a packet component. Accordingly, in one preferred variation, the client fingerprint is the result of, producing a set of hashed packet components by individually applying a hashing process to each packet component in the set of packet components, and producing the client fingerprint by applying a combined hashing process to the set of hashed packet components as shown in FIG. 8. The combined hashing process preferably functions as an outer-hash layer to a collection if individually hashed packet components. The applying a hashing process to a set of individually hashed packet components will preferably create a single meta-hash of all the hashes acting as signals of the client type. The combined hashing process can additionally generate a substantially consistent client fingerprint that can be used as an index into a client type classification data resource. In one implementation, the data resource includes a database of blacklisted and/or whitelisted clients that is indexed by the client fingerprint. Selecting a client type can include searching the database using the single meta-hash resulting from the combined hashing process. In the variation with a blacklist and/or whitelist databases, finding the meta-hash value in one of the databases can indicate if the client is permitted (whitelisted) or prohibited/blocked (blacklisted). With a combined hashing, any client fingerprint changes to any of those subsignals (the packet components) automatically rolls up observably into calculation and generation of the meta-hash client fingerprint. This preferably enables detecting a change in any one of the packet component subsignals and treat it as a unique fingerprint to which policy rules can be configured and applied This approach can also make the process for managing how clients are handled straight forward since adding a client fingerprint (the meta-hash) to a database can serve to assign the client type and network management of a client. For example, if a client fingerprint "FEF417DFB97DF4EC8715382CE80770A1, which is combined hash, is found to be a known python variant that should be blocked, then that client fingerprint hash can be added to the blacklist database (or labeled as a blacklisted client fingerprint).

The order of and process for applying the hashing process is preferably configured to make generation of the client fingerprint to be reproducible. Hashing or applying a hashing process preferably characterizes the execution of a hash function that maps data of an arbitrary size to a set of values (generally fixed-size values). The output from a hash function can be referred to as a hash or hashed value or simply hashes. In one preferred example, an MD5 hashing algorithm is implemented in generating a client fingerprint S130. Alternatively, any type of compression or hashing algorithm or approach may be implemented in generating a client fingerprint S130. Alternatively, the client fingerprint can be a data model representing each encoded packet component.

The encoding process and data modeling of the client fingerprint can have any suitable other variations.

Specifically, the generating a client fingerprint S130 can include hashing the client cipher suite list, hashing the list of compression methods, hashing the client point formats, hashing the list of client supported application protocols, hashing a list of the client-supported extensions, and/or hashing other suitable packet components. The list can be a sorted order of elements, the presented order from the client data packet, or any suitable organization or formation. In one exemplary variation, hashing a list of the client-supported extensions can be characterized as hashing a formation of elements from the list of client-supported extensions. In other embodiments, the client fingerprint can include other elements derived from the handshake including any attributes or parameters that accompany the network traffic passing back and forth between the client and the server. The approach is not limited to any particular handshake protocol or to any attribute of a network session and can be readily adapted as handshake protocols are modified and extended.

In generating a client fingerprint S130, the set of packet components may be hashed in a specific way to give the client fingerprint certain properties. One property of the client fingerprint may be that each packet component from the set of packet component may be distinguished within the client fingerprint, such that subsections of the client fingerprint may be utilized independently. For example, the client cipher suite list of the client fingerprint may be distinct from the client supported application protocols list on the same client fingerprint. Another property of the client fingerprint may be allowing comparison of ordered and unordered client fingerprints. Client fingerprints may be compared to each other and determined to be "identical" in content but different in the order of the content. In one variation, the client fingerprint may be a data model wherein there are two or more fields. Those fields could be configured in a variety of ways. In some variations, the fields may be based on packet component content (e.g., the values presented for a particular property of a client hello message) and packet component order (e.g., the order in which a list of elements are presented for a particular property of the client hello message). A content and/or order property could be specified for one or more different packet components. For example, two clients can contain the same cipher suites in their cipher suite list, but the order of preference of the cipher suites is different for each client. These distinctions may be determined from comparison of the two client fingerprints. This analysis of the client fingerprint may be implemented for the entire client fingerprint. Additionally, this analysis may be implemented for any one, or some, client fingerprint subsections.

Block S140, which includes assigning a client type, functions in demarcating the client, dependent on the client fingerprint. Assigning the client type will preferably assign the client type to the network traffic of the associated client. Assigning the client type is preferably performed based, at least in part, on the client fingerprint. Various approaches may be used in assigning the client type. The client type may be determined based on identifying a classification associated with the client fingerprint, by assigning a classification based on the combination of properties and/or distinguishing characteristics of the client fingerprint, by detecting patterns of occurrence of a client fingerprint, and/or other suitable approaches.

As discussed above, the method may involve building a client type classification data resource that can be used in assigning a client type for a given client fingerprint. In some variations such a data resource is built through collection of data. In some variations, such a data resource is already provided. A classification may be established between the client fingerprint and higher-level client property (e.g., IOS user) using a determined mapping. For example, creating a mapping of client fingerprint and a client classification may be formed through initial monitoring of network traffic and then continuously maintained and updated for new client fingerprints. Additionally or alternatively, a classification may be "learned" (e.g., through machine learning or correlation analysis). Other features of network traffic like application layer traffic such as HTTPS traffic, application-specific actions (e.g., type of client behavior with an application), and the like may be used in classifying the client fingerprint. For example, after detecting a number of clients as performing fraudulent actions, their corresponding client fingerprints (if common amongst them) may be classified as a fraudulent-actor client. If a connection cannot be determined assigning a client type S140 may give an "unknown" classification. An "unknown" classification may be flagged for subsequent monitoring or inspection. If a human or computer system later flags the client (positively or negatively), then that data may be used to inform the subsequent assignment of a client type of a similar or matching client fingerprint.

In one variation involving identifying a classification associated with the client fingerprint, the client fingerprint can be used in querying or inspecting a client type classification data resource. In one variation, this can include selecting the client type from the client type classification data resource using the client fingerprint as the query or index into the data resource (e.g., database). The client type classification data resource can be a database mapping client fingerprints to a classification of client type. In the variation, where the client fingerprint is a character encoding, the client fingerprint can serve as the index used to query the database. If that client fingerprint has an existing classification, querying the index will yield a client type classification.

As another variation, assigning a client type may include assigning a classification based on the combination of properties and/or distinguishing characteristics of the client fingerprint. Assigning a client type may include classifying the client (into one or more classifications), scoring the client (e.g., rating of validity), tagging client properties associated with the client fingerprint, and/or characterizing in any suitable manner. This variation is preferably used when the client fingerprint is a data model representing various properties or signals related to the client type. In one preferred variation, assigning a client type S140 may include giving the client a classification.

Classifying a client type may additionally assign multiple classifications and/or scores. The classifications may overlap (e.g., browser type: chrome and operating system: iOS), be sub-types (e.g., operating system: Android, Android version: 9.0), and/or serve as complementary client types (e.g., a numerical score for each fingerprint subsection). In other embodiments, the hashing of attributes can be done in multiple tiers, where the overall fingerprint will differ where any of the sub-fingerprints at a particular tier differ. Note that client traffic can advantageously be aggregated based on overall fingerprint or based on the fingerprint at a particular tier or based on a particular sub-fingerprint.

Assigning a client type S140 may additionally include multiple levels of introspection of the client fingerprint, which functions to assign client type by similarities of individual hello client packet components. As discussed above, some variations of the client fingerprint may preserve encodings of each packet component. If the high-level client fingerprint (e.g., an encoding factoring in all components) does not satisfy a direct mapping to a client type, then individual component level analysis can be performed.

Giving the client a classification may include assigning a traffic management classification to the client S142. A traffic management classification functions to notify the host or the filtering service provider on how to manage the client. Assigning a traffic management classification S142 may thus tag the client for filtering the client traffic. Assigning a traffic management classification S142 preferably assigns at least one traffic management classification to the client. In some variations, the client type identified for the client fingerprint may incorporate information to serve as the traffic management classification—in other words, the client type may suffice or serve as an indicator for traffic management.

One preferred traffic management classification is blacklist. Assigning the blacklist classification to a client may suggest that all client traffic should be blocked. A database or list of blacklisted client fingerprints can be maintained and used to directly assign the blacklist client type to a client fingerprint. Another preferred traffic management classification is whitelist. Assigning the whitelist classification may suggest that all client traffic should be left unrestricted. Another preferred traffic management classification is "unknown". A database or list of whitelisted client fingerprints can similarly be maintained and used to assign the whitelist client type to a client fingerprint. Assigning the unknown classification to a client may suggest that the client fingerprint is not sufficiently recognizable to match any other traffic management classification.

Additional and/or alternative traffic management classifications may be implemented as desired. Examples of additional classifications may include: suspicious client (e.g. suggesting the client traffic should be monitored), bot client (e.g., suggesting the client is not a person and the host should act accordingly), limited access client (e.g., suggesting the client traffic should be throttled or limited in accessibility). Traffic management classifications may be host specifically implemented. For example, a guest user classification may be implemented for a bank server. A guest user flag may suggest that the bank server should limit the number of transactions the client can make and/or the limit bank data the client can access, and/or throttle the client traffic.

In one variation, assigning a client type may include comparing a client fingerprint to a client-presented client type. Additionally or alternatively, this may include comparing an assigned client type to a client-presented client type. These variations function to assess if the client is honestly announcing the type of client in other communications. The client-presented client type can be the user-agent header value used during HTTP/S communications, but could alternatively be any suitable communication where the client makes a claim as to the type of client device it is. In some cases, a type of user agent may be associated with one or more expected client fingerprint. If the client fingerprint does not match one of the expected client fingerprints based on the presented user agent, then this can signal that a) a change in the user agent has introduced a new client fingerprint or b) the client is acting in bad faith by claiming a false user agent. In the case of a), the new client fingerprint may be monitored or selected for labeling. In the case of b) this may contribute to classifying the client type as one to monitor or flag for possible illicit behavior. Comparing of client fingerprint and/or client type to a client-presented client type may be used in updating or adjusting the assignment of a client type. For example, if the comparison indicates there is a mismatch, then the client type may be set to indicate as such (e.g., possible bot). Comparing of client fingerprint and/or client type to a client-presented client type may additionally or alternatively be used in updating or adjusting the client type classification data resource such that it may be used to alter the assignment of a client type of subsequent client fingerprints.

The method may further include filtering the client traffic S150. Filtering the client traffic S150 functions in managing the client traffic based on the traffic management classification(s) of the client. Filtering client traffic preferably includes filtering the network traffic from the client. Filtering the client traffic S150 preferably manages the client traffic as per the suggestion of the traffic management classification (e.g., block blacklist classified client traffic and not impede whitelist classified client traffic). Specifically, filtering the network traffic of a client will include limiting and/or preventing network traffic from a client because of a client type indicative of some concern. Additionally or alternatively, filtering the network traffic of a client may include expressly permitting network traffic from a client (wherein by default network traffic may be denied or limited). Filtering of the network traffic may be performed based on blacklisting and/or whitelisting of client types and/or client fingerprints. Alternatively, filtering the client traffic S150 may manage the client traffic different to the traffic management suggestions. For the previous bank example, filtering client traffic S150 of the guest user client may be time dependent, and the bank server may not throttle the client traffic activity during non-peak activity hours. Any suitable traffic enforcement policy may be applied.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

In one variation, a system comprising of one or more non-transitory computer-readable mediums storing instructions that, when executed by the one or more computer processors, cause a computing platform to perform operations comprising those of the system or method described herein such as: receiving a client data packet, extracting a set of packet components from the client data packet, generating a client fingerprint from the set of packet components, assigning a client type using the client fingerprint, and optionally filtering network traffic at least partly based on the client type.

Figure 11:
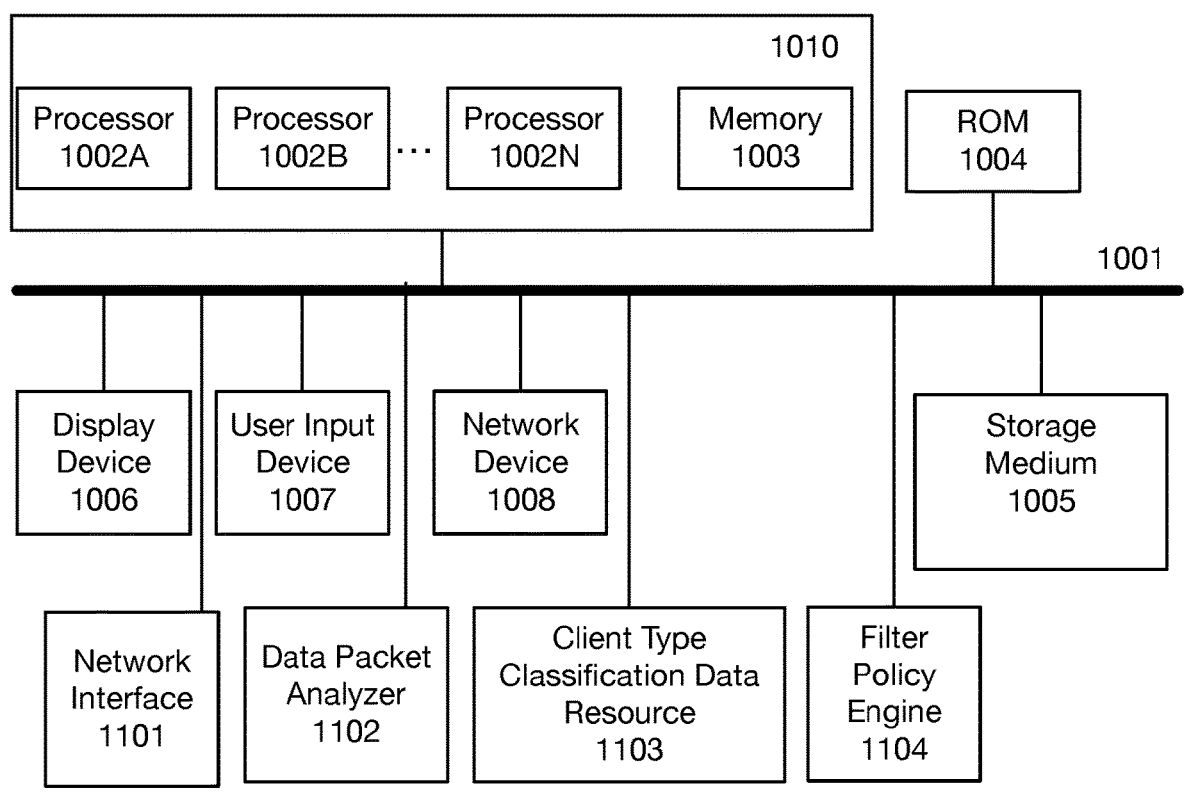
FIG. 11 is an exemplary system architecture that may be used in implementing the system and/or method.

FIG. 11 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1202N, the memory (e.g., a random access memory (RAM)) 1003, a read only memory (ROM) 1004, a processor-readable storage medium 1005, a display device 1006, a user input device 1007, and a network device 1008. As shown, the computer infrastructure may be used in connecting a network interface 1101, a data packet analyzer 1102, a client type classification data resource 1103, a filter policy engine, and/or other suitable computing devices.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1201A-1201N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1205 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1205 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

I claim:

1. A method comprising:
receiving a client data packet from network traffic with a client device;
extracting a set of packet components from the client data packet;
individually applying a hash operation to each of the set of packet components to generate a set of hashed packet components;
applying a hash operation to the set of hashed packet components to generate a hash of the set of hashed packet components;
generating a multiple tiered client fingerprint with an overall client fingerprint from the hash of the set of hashed packet components and a set of sub-fingerprints from the set of hashed packet components; and
assigning a client type to the network traffic using the multiple tiered client fingerprint.

2. The method of claim 1, wherein the client data packet is a client hello message received during negotiation during a cryptographic protocol.

3. The method of claim 2, wherein the cryptographic protocol is a transport layer security (TLS) protocol.

4. The method of claim 2, further comprising filtering the network traffic of the client device based at least in part on the client type.

5. The method of claim 4, wherein assigning the client type to the network traffic using the multiple tiered client fingerprint comprises of selecting the client type from a database mapping multiple tiered client fingerprints to a classification of client type.

6. The method of claim 4, wherein extracting the set of packet components comprises extracting identifying data from a client cipher suite list and a list of compression methods from the client hello message; and wherein generating the multiple tiered client fingerprint comprises encoding the set of packet components into the multiple tiered client fingerprint as a character representation, wherein individually applying the hash operation to each of the set of packet components to generate the set of hashed packet components comprises hashing the client cipher suite list and hashing the list of compression methods.

7. The method of claim 4, wherein filtering the network traffic further comprises limiting network traffic from a client because of the client type.

8. The method of claim 2, wherein generating the multiple tiered client fingerprint further comprises encoding the set of packet components into the multiple tiered client fingerprint as a character representation.

9. The method of claim 8, wherein encoding the set of packet components into the multiple tiered client fingerprint as a character representation of the hash of the set of hashed packet components and the set of sub-fingerprints from the set of hashed packet components.

10. The method of claim 8, wherein extracting the set of packet components further comprises extracting identifying data from a client cipher suite list from the client hello message; and wherein individually applying the hash operation to each of the set of packet components to generate the set of hashed packet components comprises hashing the client cipher suite list.

11. The method of claim 8, wherein extracting the set of packet components further comprises extracting identifying data from a list of compression methods from the client hello message; and wherein individually applying the hash operation to each of the set of packet components to generate the set of hashed packet components comprises hashing the list of compression methods.

12. The method of claim 8, wherein extracting the set of packet components further comprises extracting identifying data from a client point formats from the client hello message; and wherein individually applying the hash operation to each of the set of packet components to generate the set of hashed packet components comprises hashing the client point formats.

13. The method of claim 8, wherein extracting the set of packet components further comprises extracting identifying data from a list of supported application protocols from the client hello message; and wherein individually applying the hash operation to each of the set of packet components to generate the set of hashed packet components comprises hashing the list of supported application protocols.

14. The method of claim 8, wherein extracting the set of packet components further comprises extracting identifying data from a list of client-supported extensions from the client hello message; and wherein individually applying the hash operation to each of the set of packet components to generate the set of hashed packet components comprises hashing a formation of the list of client-supported extensions.

15. A non-transitory computer-readable medium storing instructions that, when executed by one or more computer processors of a communication platform, cause the communication platform to perform operations comprising:
receiving a client data packet from network traffic with a client device;
extracting a set of packet components from the client data packet;
individually applying a hash operation to each of the set of packet components to generate a set of hashed packet components;
applying a hash operation to the set of hashed packet components to generate a hash of the set of hashed packet components;
generating a multiple tiered client fingerprint with an overall client fingerprint from the hash of the set of hashed packet components and a set of sub-fingerprints from the set of hashed packet components; and assigning a client type to the network traffic using the multiple tiered client fingerprint.

16. The non-transitory computer-readable medium of claim 15, wherein the client data packet is a client hello message received during negotiation during a transport layer security (TLS) protocol.

17. The non-transitory computer-readable medium of claim 16, wherein extracting the set of packet components comprises extracting identifying data from a client cipher suite list and a list of compression methods from the client hello message; wherein generating the multiple tiered client fingerprint comprises encoding the set of packet components into the multiple tiered client fingerprint as a character representation; wherein individually applying the hash operation to each of the set of packet components to generate the set of hashed packet components comprises hashing the client cipher suite list and hashing the list of compression methods; and wherein assigning the client type to the network traffic using the multiple tiered client fingerprint comprises selecting the client type from a database mapping multiple tiered client fingerprints to a classification of client type; and further comprising filtering the network traffic of the client device based at least in part on the client type.

18. The non-transitory computer-readable medium of claim 17, wherein extracting the set of packet components comprises extracting identifying data from the client point formats, the list of supported application protocols, and the list of client-supported extensions from the client hello message; wherein individually applying the hash operation to each of the set of packet components to generate the set of hashed packet components comprises hashing the client point formats, hashing the list of supported application protocols, and hashing the list of client-supported extensions.

19. The system of claim 18, wherein the client data packet is a client hello message received during negotiation during a transport layer security (TLS) protocol.

20. The system of claim 19, wherein instructions to extract the set of packet components comprises instructions to extract identifying data from the client point formats, the list of supported application protocols, and the list of client-supported extensions from the client hello message; wherein instructions to individually applying the hash operation to each of the set of packet components to generate the set of hashed packet components comprises instructions to hash the client point formats, hash the list of supported application protocols, and hash the list of client-supported extensions.

21. A system comprising of:
a network traffic data interface with access to client data packet from network traffic with a client device; and
a data packet analyzer that receives the client data packet from the network traffic data interface and comprises one or more computer-readable mediums storing instructions that, when executed by the one or more computer processors, cause a computing platform to:
extract a set of packet components from the client data packet,
individually apply a hash operation to each of the set of packet components to generate a set of hashed packet components,
apply a hash operation to the set of hashed packet components to generate a hash of the set of hashed packet components,
generate a multiple tiered client fingerprint with an overall client fingerprint from the hash of the set of hashed packet components and a set of sub-fingerprints from the set of hashed packet components, and assign a client type to the network traffic using the multiple tiered client fingerprint.

22. The system of claim 21, wherein instructions to extract the set of packet components comprises instructions to extract identifying data from a client cipher suite list and a list of compression methods from the client hello message; wherein instructions to generate the multiple tiered client fingerprint comprises instructions to encode the set of packet components into the multiple tiered client fingerprint as a character representation, wherein instructions to individually apply the hash operation to each of the set of packet components to generate the set of hashed packet components comprises instructions to hash the client cipher suite list and hash the list of compression methods; and wherein instructions to assign the client type to the network traffic using the multiple tiered client fingerprint comprises instructions to select the client type from a database mapping multiple tiered client fingerprints to a classification of client type; and further comprising instructions to filter the network traffic of the client device based at least in part on the client type.

\* \* \* \* \*